US009638595B2

(12) United States Patent
Shigeta

(10) Patent No.: US 9,638,595 B2
(45) Date of Patent: May 2, 2017

(54) TORQUE MEASURING UNIT FOR ELECTRIC POWER STEERING DEVICE AND METHOD OF ASSEMBLING THE SAME

(71) Applicant: NSK LTD., Tokyo (JP)

(72) Inventor: Taishi Shigeta, Maebashi (JP)

(73) Assignee: NSK LTD., Tokyo (JP)

( * ) Notice: Subject to any disclaimer, the term of this patent is extended or adjusted under 35 U.S.C. 154(b) by 0 days.

(21) Appl. No.: 15/027,042

(22) PCT Filed: Nov. 13, 2014

(86) PCT No.: PCT/JP2014/080124
§ 371 (c)(1),
(2) Date: Apr. 4, 2016

(87) PCT Pub. No.: WO2015/076184
PCT Pub. Date: May 28, 2015

(65) Prior Publication Data
US 2016/0238476 A1   Aug. 18, 2016

(30) Foreign Application Priority Data

Nov. 21, 2013   (JP) .................................. 2013-240505

(51) Int. Cl.
*G01L 3/02* (2006.01)
*G01L 5/22* (2006.01)
(Continued)

(52) U.S. Cl.
CPC ............ *G01L 5/221* (2013.01); *B62D 5/0481* (2013.01); *B62D 6/10* (2013.01); *G01L 3/10* (2013.01); *G01L 5/0009* (2013.01)

(58) Field of Classification Search
CPC ......... G01L 5/221; G01L 3/10; B62D 5/0481; B62D 6/10
(Continued)

(56) References Cited

U.S. PATENT DOCUMENTS 6,000,491 A * 12/1999 Shimizu ................... B62D 6/10
                                                          180/444
2005/0133297 A1* 6/2005 Chikaraishi .......... B62D 5/0424
                                                          180/444
(Continued)

FOREIGN PATENT DOCUMENTS

CN        101863282 A     10/2010
JP       2005-37175 A      2/2005
(Continued)

OTHER PUBLICATIONS

Search Report dated Feb. 17, 2015 issued by the International Searching Authority in counterpart International Patent Application No. PCT/JP2014/080124 [PCT/ISA/210].
(Continued)

*Primary Examiner* — Max Noori
(74) *Attorney, Agent, or Firm* — Sughrue Mion, PLLC

(57) ABSTRACT

An eccentric guide surface portion (48), which has a shape of a partially cylindrical surface, is formed at a front end portion of a second cylindrical surface portion (32*a*), into which a torque detecting coil unit (31*a*) is fitted and fixed, of an inner peripheral surface of a housing body (16*a*) that is joined and fixed to a front end portion of a steering column. The center of curvature of the eccentric guide surface portion (48) is offset to a side opposite to a connection hole (39*a*), which is formed at the housing body (16*a*), in a radial direction so that a connection terminal (36*a*) of the torque detecting coil unit (31*a*) is connected to a circuit board (40*a*). Accordingly, a torque measuring unit for an electric power steering device, of which the size and weight are reduced while good assembly workability is ensured, is obtained.

5 Claims, 13 Drawing Sheets

(51) Int. Cl.
  *B62D 6/10* (2006.01)
  *B62D 5/04* (2006.01)
  *G01L 3/10* (2006.01)
  *G01L 5/00* (2006.01)

(58) Field of Classification Search
  USPC .................. 73/862.331–862.335, 862.322
  See application file for complete search history.

(56) References Cited

U.S. PATENT DOCUMENTS

| | | | |
|---|---|---|---|
| 2005/0155811 A1* | 7/2005 | Chikaraishi ............. | B62D 6/10 180/444 |
| 2005/0193835 A1* | 9/2005 | Kondo ..................... | B62D 6/10 73/862.331 |
| 2011/0167928 A1* | 7/2011 | Maehara .................. | B62D 6/10 73/862.325 |
| 2012/0125138 A1* | 5/2012 | Islam ...................... | G01L 5/221 74/492 |
| 2012/0204638 A1* | 8/2012 | Kakuda ................... | F16C 33/78 73/494 |
| 2012/0241246 A1 | 9/2012 | Kuroumaru | |
| 2013/0113470 A1* | 5/2013 | Kegeler ................... | G01B 7/30 324/207.25 |

FOREIGN PATENT DOCUMENTS

| | | |
|---|---|---|
| JP | 2005-247225 A | 9/2005 |
| WO | 03/104065 A1 | 12/2003 |
| WO | 2008/053594 A1 | 5/2008 |

OTHER PUBLICATIONS

Written Opinion dated Feb. 17, 2015 issued by the International Searching Authority in counterpart International Patent Application No. PCT/JP2014/080124 [PCT/ISA/237].

Communication issued Aug. 1, 2016, issued by the European Patent Office in counterpart European Patent Application 14864532.8.

Communication issued Feb. 27, 2017 by the Chinese Patent Office in counterpart Chinese Patent Application 201480054995.8.

* cited by examiner

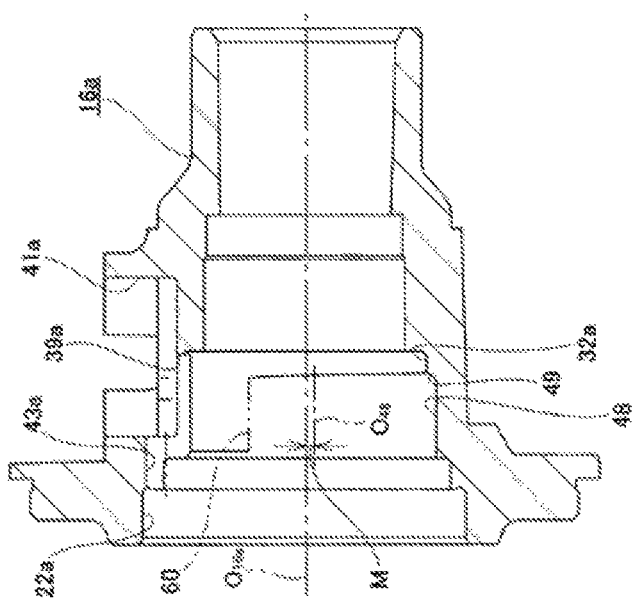
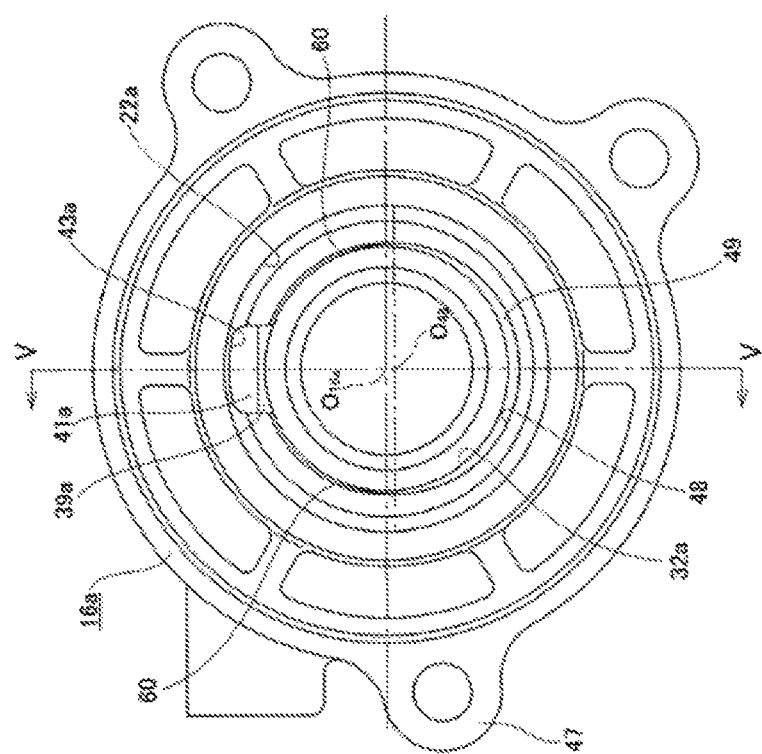

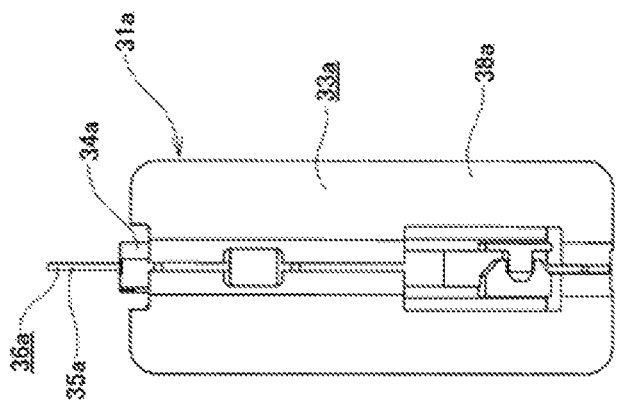
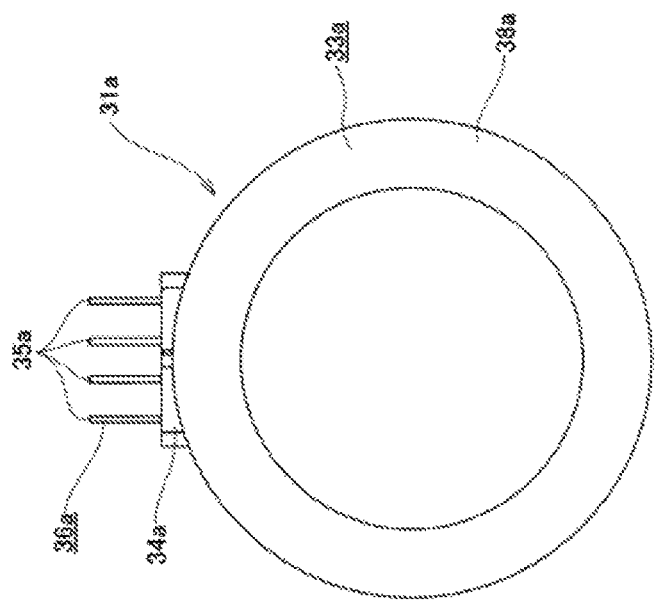

TORQUE MEASURING UNIT FOR ELECTRIC POWER STEERING DEVICE AND METHOD OF ASSEMBLING THE SAME

TECHNICAL FIELD

The present invention relates to the improvement of a torque measuring unit, which is used in an electric power steering device that reduces a force required for a driver to operate a steering wheel, and a method of assembling the torque measuring unit.

BACKGROUND ART

A steering device for an automobile is formed as shown in FIG. 9, transmits the rotation of a steering wheel 1 to an input shaft 3 of a steering gear unit 2, and makes front wheels have a steering angle by pushing and pulling a pair of (left and right) tie-rods 4 and 4 according to the rotation of the input shaft 3. The steering wheel 1 is supported by and fixed to a rear end portion of a steering shaft 5. While the steering shaft 5 is inserted into a cylindrical steering column 6, which is supported by a vehicle body, in an axial direction, the steering shaft 5 is rotatably supported by the steering column 6. Further, a front end portion of the steering shaft 5 is connected to a rear end portion of an intermediate shaft 8 through a universal joint 7, and a front end portion of the intermediate shaft 8 is connected to the input shaft 3 through another universal joint 9. Furthermore, an example shown in FIG. 9 is an electric power steering device that uses an electric motor 10 as a source of auxiliary power to reduce a force required to operate the steering wheel 1.

Further, as long as a front-rear direction is not otherwise described, the front-rear direction means a front-rear direction of a vehicle in the entirety of this specification and claims.

FIGS. 10 and 11 show a structure disclosed in Patent Document 1 as an example of a more specific structure of the electric power steering device. An inner column 11 and an outer column 12 are combined with each other so that a total length of the inner column 11 and the outer column 12 can be reduced at the time of secondary collision. As a result, a steering column 6a is formed. The steering column 6a is supported by the vehicle body. Further, a lower shaft 13 and an upper shaft 14 are combined with each other so that torque can be transmitted between the lower and upper shafts 13 and 14 and a total length of the lower and upper shafts 13 and 14 can be reduced at the time of secondary collision. As a result, a steering shaft 5a, which is rotatably supported in the steering column 6a, is formed. A steering wheel 1 (see FIG. 9) is fixed to a rear end portion of the upper shaft 14 that protrudes from a rear end opening of the outer column 12. Furthermore, a housing 15 is joined and fixed to a front end portion of the inner column 11, and a front half portion of the lower shaft 13 is inserted into the housing 15. The housing 15 includes a stepped cylindrical housing body 16 that is joined and fixed to the front end portion of the inner column 11, and a substantially annular lid body 17 that is fixed to a front end portion of the housing body 16.

The lower shaft 13 as an input shaft and an output shaft 19, which are coaxially connected to each other by a torsion bar 18, are rotatably supported in the housing 15. Most of the torsion bar 18 except for a front end portion thereof is disposed on the inner diameter side of the lower shaft 13 that is formed in the shape of a hollow shaft. Moreover, the output shaft 19 is disposed on the front side of the lower shaft 13, and is supported by a pair of ball bearings 20 and 21 so as to be rotatable relative to the housing 15. More specifically, an intermediate portion of the output shaft 19 is rotatably supported by the ball bearing 20 that is fitted and fixed to an inner peripheral surface of the lid body 17, and a rear end portion of the output shaft 19 is rotatably supported by the ball bearing 21 that is fitted and fixed into a first cylindrical surface portion 22 that is formed at a front end portion (which corresponds to one end portion in the axial direction) of the inner peripheral surface of the housing body 16. Further, a worm wheel 23 is fitted around and fixed to a rear end portion of the output shaft 19. A worm 24, which is rotatably supported in the housing 15, meshes with the worm wheel 23. Furthermore, the electric motor 10 (see FIG. 9) is supported by and fixed to the housing 15, and an output shaft of the electric motor 10 is joined to a base end portion of the worm 24 so that torque can be transmitted to the base end portion of the worm 24.

Moreover, a cylindrical portion 26, which includes a female stopper portion 25 having an uneven shape in a circumferential direction and formed on an inner peripheral surface thereof, is formed at the rear end portion of the output shaft 19. Meanwhile, a male stopper portion 27, which has an uneven shape in the circumferential direction and of which the outer diameter (the diameter of a circumcircle) is smaller than the outer diameter of the front end portion, is formed on the front end portion of the outer peripheral surface of the lower shaft 13. The male stopper portion 27 and the female stopper portion 25 are engaged with each other so as to be relatively rotatable within a predetermined angular range (a range of, for example, ±5° from a neutral state where the torsion bar 18 is not twisted). Accordingly, the excessive torsion of the torsion bar 18 is prevented.

Further, the lower shaft 13 is made of steel, which is magnetic metal, and a torque detecting uneven portion 28, which has an uneven shape in the circumferential direction, is formed at the front end portion of the outer peripheral surface of the lower shaft 13. A cylindrical torque detecting sleeve 29 made of non-magnetic metal having conductivity, such as an aluminum alloy, is disposed on the outer diameter side of the torque detecting uneven portion 28. A base end portion of the torque detecting sleeve 29 is fitted around and fixed to the cylindrical portion 26. Furthermore, a plurality of window holes 30 and 30 are formed at a portion, which is positioned on the outer diameter side of the torque detecting uneven portion 28, of the torque detecting sleeve 29. Moreover, a torque detecting coil unit 31, which is fitted and fixed into the housing 15 (the housing body 16), is disposed on the outer diameter side of the torque detecting uneven portion 28 and the torque detecting sleeve 29.

The torque detecting coil unit 31 is fitted and fixed into a second cylindrical surface portion 32 that is formed on a portion, which is positioned on the rear side (which corresponds to the other side in the axial direction) of the first cylindrical surface portion 22, of the inner peripheral surface of the housing body 16. The torque detecting coil unit 31 includes a cylindrical detection body 33, a pedestal 34 that is formed so as to protrude outward from the outer peripheral surface of the detection body 33 in a radial direction, and a connection terminal 36 that includes a plurality of pins 35 and 35 embedded into the pedestal 34. The detection body 33 includes a plurality of (two in the example shown in the drawings) cylindrical coil bobbins 37 and 37 that are formed by a winding of coils, and a yoke member 38 that covers the respective coil bobbins 37 and 37. The connection terminal 36 is formed so as to protrude outward from a part of a circumference of the detection body 33 in the racial direction, and is connected to the respective coil bobbins 37 and 37. Meanwhile, the second cylindrical surface portion 32 is formed concentrically with the first cylindrical surface portion 22, and has a diameter smaller than a diameter of the first cylindrical surface portion 22. For this reason, the torque detecting coil unit 31 (the detection body 33), which is fitted and fixed into the second cylindrical surface portion 32, is disposed concentrically with the ball bearing 21 fitted and fixed into the first cylindrical surface portion 22, and the outer diameter of the torque detecting coil unit 31 is smaller than the outer diameter of the ball bearing 21.

The connection terminal 36 is connected to a circuit board 40 through a connection hole 39 that is a through hole formed at a portion matching the second cylindrical surface portion 32 in the front-rear direction on a part of the housing body 16 in the circumferential direction. The circuit board 40 is disposed in a storage space 41 that is formed at a portion, which matches the connection hole 39 in the circumferential direction, of the outer peripheral surface of the housing body 16 so as to be recessed inward in the radial direction. The storage space 41 is closed from the outside by a lid member 42 that is mounted on an outer peripheral surface of the housing body 16. Further, a recessed groove 43, which is recessed outward in the radial direction to allow the connection terminal 36 to pass therethrough in the front-rear direction during assembly work, is formed at a portion, of which a phase corresponds to a phase of the connection hole 39 in the circumferential direction, of the inner peripheral surface of the housing body 16 between the connection hole 39 and the first cylindrical surface portion 22 in the front-rear direction.

When torque as a steering force is applied to the steering shaft 5a by the driver's operation of the steering wheel 1 in the case of the electric power steering device having the above-mentioned structure, the torsion bar 18 is elastically twisted (within a predetermined angular range) so as to correspond to a direction and a magnitude of this torque. Accordingly, a change of impedance occurs on the coil bobbins 37 and 37 of the torque detecting coil unit 31 due to the change of a positional relationship between the torque detecting uneven portion 28 and the torque detecting sleeve 29 in the circumferential direction. For this reason, it is possible to detect the direction and the magnitude of torque on the basis of the change of impedance. The electric motor 10 generates auxiliary power corresponding to a torque detection result. The auxiliary power is applied to the output shaft 19 after being increased by a worm-type speed reducer 44 that includes the worm 24 and the worm wheel 23 meshing with each other. As a result, a force, which is required for a driver to operate the steering wheel 1, is reduced.

Meanwhile, when the torsion of the torsion bar 18 reaches an upper limit on one side or the other side of the predetermined angular range due to the input of large torque to the steering shaft 5a from the steering wheel 1, the female stopper portion 25 and the male stopper portion 27 mesh with each other in the circumferential direction. Further, a part of torque is directly transmitted to the output shaft 19 from the lower shaft 13 on the basis of the mesh.

Incidentally, when the electric power steering device having an above-mentioned structure is assembled, there is a possibility that following problems may occur during work for fitting and fixing the torque detecting coil unit 31 into the second cylindrical surface portion 32 formed on the inner peripheral surface of the housing body 16.

In recent years, an importance of a reduction of a size or weight of the electric power steering device has increased in order to further improve a fuel saving of an automobile. For this reason, it is considered that the size or weight of the output shaft 19 of the torque measuring unit or peripheral components thereof needs to be reduced. It is possible to reduce the diameters of the output shaft 19 and the ball bearings 20 and 21 among the output shaft and the peripheral components while ensuring torque detection performance. However, sufficient height of a terminal is necessary for a connection of the connection terminal 36 to the circuit board 40. Meanwhile, work for fitting and fixing the torque detecting coil unit 31 into the second cylindrical surface portion 32 has been performed in the past such that the torque detecting coil unit 31 is inserted into the housing body 16 from an opening portion close to a front end of the housing body 16 (close to the first cylindrical surface portion 22) while a central axis $O_{31}$ of the torque detecting coil unit 31 and a central axis $O_{16}$ of the housing body 16 correspond to each other as shown in FIGS. 12 and 13. For this reason, when a distance (H) between a center of the torque detecting coil unit 31 (the detection body 33) and an end edge of the connection terminal 36 is larger than a half (d) of an inner diameter of the first cylindrical surface portion 22 (H>d), the connection terminal 36 interferes with the housing body 16. Accordingly, assembly work cannot be performed.

Meanwhile, obliquely inserting the torque detecting coil unit 31 into the housing body 16 is also considered to solve these problems. However, in this case, there is a new problem in that it is also difficult to perform automatic assembly due to a deterioration of workability.

PRIOR ART DOCUMENT

Patent Document

Patent Document 1: International Publication No. 2003/104065

SUMMARY OF THE INVENTION

Problem to be Solved

The invention has been made in consideration of the above-mentioned circumstances, and an object of the invention is to provide a torque measuring unit for an electric power steering device of which the size and weight are reduced while good assembly workability is ensured, and a method of assembling the torque measuring unit.

Means for Solving the Problem

A torque measuring unit for an electric power steering device according to an aspect of the invention includes: a housing that includes a housing body and a lid body fixed to the housing body; an input shaft and an output shaft that are rotatably supported in the housing and are coaxially connected to each other by a torsion bar; a rolling bearing (including, for example, a ball bearing, a roller bearing, and the like) that is fitted and fixed into a first cylindrical surface portion formed at one end portion of an inner peripheral surface of the housing body in an axial direction and supports the output shaft so as to allow the output shaft to be rotatable relative to the housing body; and a torque detecting coil unit that is fitted and fixed into a second cylindrical surface portion having a diameter smaller than a diameter of the first cylindrical surface portion and formed closer to the other side of the inner peripheral surface of the housing body in the axial direction than the first cylindrical surface portion so as to be concentric with the first cylindrical surface portion, and detects a direction and a magnitude of torque applied to the input shaft.

The torque detecting coil unit includes an annular (including, for example, cylindrical) detection body that includes a coil (for example, a coil wound on a coil bobbin), and a connection terminal which is provided at a portion of the detection body in a circumferential direction so as to protrude outward in a radial direction and in which a distance between a center of the detection body and an end edge of the connection terminal is larger than a half of an outer diameter of the rolling bearing.

A connection hole, which is formed in the radial direction to connect the connection terminal to a circuit board, is formed at a portion matching the second cylindrical surface portion in the axial direction on a part of the housing body in the circumferential direction. Further, a recessed groove, which is recessed outward in the radial direction, is formed at a portion, of which a phase corresponds to a phase of the connection hole in the circumferential direction, of the inner peripheral surface of the housing body between the connection hole and the first cylindrical surface portion in the axial direction.

Particularly, in the case of the torque measuring unit for an electric power steering device according to the aspect of the invention, an eccentric guide surface portion, which has the shape of a partially cylindrical surface (including, for example, not only a constant partially cylindrical surface of which a radius of curvature is not changed in the axial direction but also a partially conical-cylindrical surface of which a radius of curvature is reduced toward the other side in the axial direction) and of which a center of curvature is offset to a side opposite to a side on which the connection hole (and the recessed groove) is formed in the radial direction, is formed at one end portion of the second cylindrical surface portion in the axial direction. Further, the eccentric guide surface portion and the second cylindrical surface portion are continuous in an axial direction through a stepped surface.

Meanwhile, the radius of curvature of the eccentric guide surface portion may be larger than a half of an inner diameter of the second cylindrical surface portion, and may be equal to the half of the inner diameter of the second cylindrical surface portion.

When the above-mentioned torque measuring unit for an electric power steering device according to the aspect of the invention is embodied, the radius of curvature of the eccentric guide surface portion may be larger than the half of the inner diameter of the second cylindrical surface portion and a pair of continuous portions, which allows the eccentric guide surface portion and the second cylindrical surface portion to be continuous in the circumferential direction, may be positioned closer to a side, on which the connection hole is formed, than a central axis of the housing body in the radial direction.

Furthermore, when the torque measuring unit for an electric power steering device according to the aspect of the invention is embodied, the stepped surface may be an inclined surface that is inclined inward in the radial direction toward the other side in the axial direction.

Moreover, when the torque measuring unit for an electric power steering device according to the aspect of the invention is embodied, the connection terminal may be embedded into a pedestal that is formed so as to protrude outward from an outer peripheral surface of the detection body in the radial direction. Further, while the outer peripheral surface of the detection body comes into contact with the eccentric guide surface portion and the connection terminal enters the recessed groove, side surfaces of the pedestal in the circumferential direction and side surfaces of the recessed groove in the circumferential direction may face each other in the circumferential direction.

Furthermore, a method of assembling a torque measuring unit for an electric power steering device according to another aspect of the invention is a method of assembling the above-mentioned torque measuring unit for an electric power steering device, and includes the following processes.

First, the torque detecting coil unit is inserted into the housing body from one axial opening portion (a front end portion in a state in which the housing body is assembled to a vehicle) of the housing body, which is close to the first cylindrical surface portion, in the axial direction (toward the rear side from the front side in an assembled state) while the torque detecting coil unit is disposed to be offset from the housing body in the radial direction so that a central axis of the torque detecting coil unit passes through the center of curvature of the eccentric guide surface portion. Accordingly, the connection terminal is made to enter the first cylindrical surface portion.

Next, the connection terminal is made to sequentially enter the recessed groove and the connection hole while the outer peripheral surface of the detection body is guided by the eccentric guide surface portion until the detection body comes into contact with the stepped surface.

Further, the torque detecting coil unit is moved in the radial direction until the central axis of the torque detecting coil unit and the central axis of the housing body correspond to each other after the detection body comes into contact with the stepped surface.

After that, the torque detecting coil unit is further moved in the axial direction to be fitted and fixed into the second cylindrical surface portion.

Effects of the Invention

According to the torque measuring unit for an electric power steering device according to the invention having the above-mentioned structure and the method of assembling the torque measuring unit, the size and weight of the electric power steering device are reduced while good assembly workability is ensured.

That is, in the case of the invention, an eccentric guide surface portion, which has the shape of a partially cylindrical surface and of which a center of curvature is offset to a side opposite to a side on which the connection hole is formed in the radial direction, is formed at one axial end portion of the second cylindrical surface portion, into which the torque detecting coil unit is fitted and fixed, of the inner peripheral surface of the housing body.

For this reason, according to the invention, the torque detecting coil unit can be inserted into the housing body while being eccentric to the side (the side on which the eccentric guide surface portion is formed) opposite to the protrusion direction of the connection terminal in the radial direction.

Accordingly, even though the diameter of the output shaft or the rolling bearing is reduced (even though the height of the connection terminal is relatively increased) without the reduction of the height of the connection terminal, it is possible to insert the torque detecting coil unit into the housing body without the interference between the connection terminal and the housing body. Further, it is also possible to guide the outer peripheral surface of the detection body by using the eccentric guide surface portion during this work.

As a result, according to the invention, the size and weight of the torque measuring unit are reduced while good assembly workability is ensured.

BRIEF DESCRIPTION OF DRAWINGS

FIG. 5A is an end view of a housing body, and FIG. 5B is a sectional view taken along line V-V of FIG. 5A.

FIG. 6A is a front view of a torque detecting coil unit, and FIG. 6B is a right side view.

DETAILED DESCRIPTION OF EMBODIMENTS

First Embodiment

Figure 9:
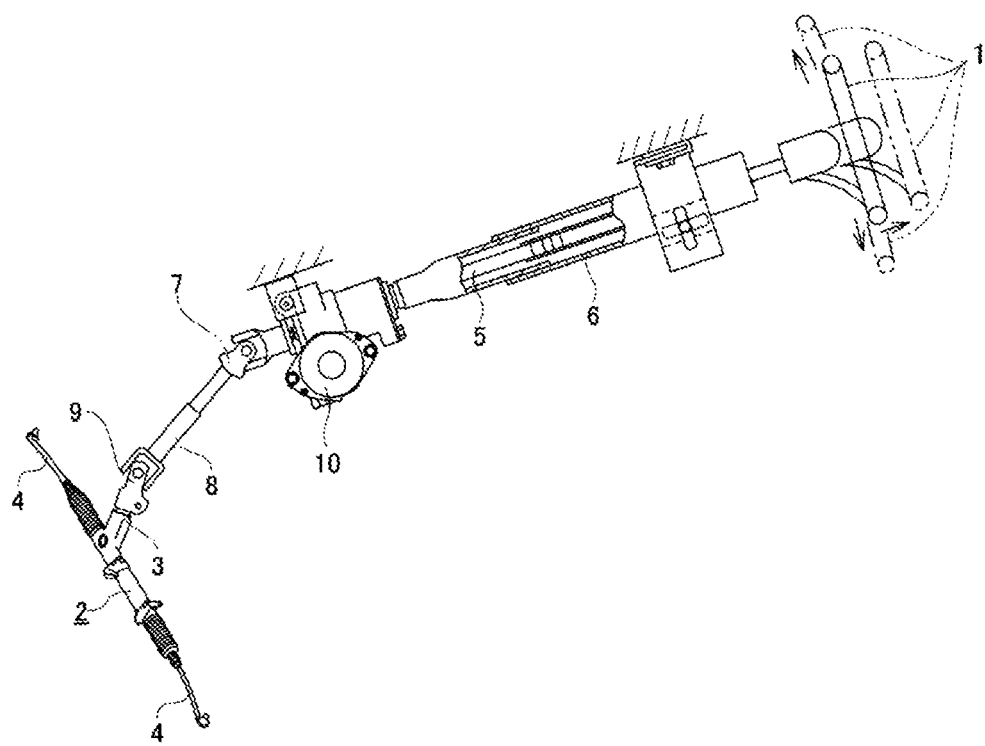
FIG. 9 is a partially sectioned side view showing an example of a steering device that has been known in the past.

A first embodiment of the invention will be described with reference to FIGS. 1 to 7. An electric power steering device of this embodiment includes a steering column 6b, a steering shaft 5b, a housing 15a, a torsion bar 18a, an output shaft 19a, a pair of ball bearings 20a and 21a, a torque detecting sleeve 29a, a torque detecting coil unit 31a, a circuit board 40a, an electric motor 10 (see FIG. 9), and a worm-type speed reducer 44a. Among these respective members, the housing 15a disposed at a front end portion of the electric power steering device and members disposed in the housing 15a form a torque measuring unit.

A cylindrical inner column 11a disposed on a front side and an outer column 12a disposed on a rear side are telescopically combined with each other, and thus the steering column 6b is formed. The steering column 6b is supported on a vehicle body by a support bracket 45. Both the inner and outer columns 11a and 12a are made of steel or a light alloy such as an aluminum alloy.

A hollow shaft-shaped upper shaft 14a disposed on a rear side is spline-fitted to a lower shaft 13a disposed on a front side so that torque can be transmitted between the upper and lower shafts 14a and 13a and the upper and lower shafts 14a and 13a can move relative to each other in an axial direction. In this manner, the steering shaft 5b is formed. The steering shaft 5b is rotatably supported in the steering column 6b. Both the lower and upper shafts 13a and 14a are made of steel. Further, a steering wheel 1 (see FIG. 9) is fixed to a rear end portion of the upper shaft 14a that protrudes from a rear end opening of the outer column 12a.

A stepped cylindrical housing body 16a and a substantially annular lid body 17a, which are made of a light alloy such as an aluminum alloy or a synthetic resin, are joined to each other by a plurality of bolts 46, and thus the housing 15a is formed. The housing body 16a is joined and fixed to a front end portion of the inner column 11a, and the lid body 17a is fixed to a front end portion of the housing body 16a so as to close a front end opening of the housing body 16a.

As shown in FIG. 5, a joining flange 47, which is joined to the lid body 17a, is provided at a front end portion of a outer peripheral surface of the housing body 16a. Further, a first cylindrical surface portion 22a into which the ball bearing 21a is fitted and fixed is formed at a front end portion of an inner peripheral surface of the housing body 16a, and a second cylindrical surface portion 32a into which the torque detecting coil unit 31a is fitted and fixed is formed on a rear side of the first cylindrical surface portion 22a. The first cylindrical surface portion 22a and the second cylindrical surface portion 32a are concentric with each other, and an inner diameter of the second cylindrical surface portion 32a is smaller than an inner diameter of the first cylindrical surface portion 22a.

Furthermore, a storage space 41a, which is recessed inward in a radial direction, is formed at a portion, of which a part (a front half portion) matches the second cylindrical surface portion 32a in a front-rear direction, at a part of an outer peripheral surface of the housing body 16a in a circumferential direction (an upper portion of the outer peripheral surface of the housing body 16a). Moreover, a connection hole 39a, which is formed in the radial direction to connect a connection terminal 36a to be described below to the circuit board 40a, is formed at a front half portion of a bottom of the storage space 41a, which is a portion matching the second cylindrical surface portion 32a in the front-rear direction, on a part of the housing body 16a in the circumferential direction (the upper portion of the housing body 16a). Further, a recessed groove 43a, which is recessed outward in the radial direction to allow the connection terminal 36a to pass therethrough in the front-rear direction during assembly work, is formed at a portion, of which a phase corresponds to a phase of the connection hole 39a in the circumferential direction, of an inner peripheral surface of the housing body 16a between the connection hole 39a and the first cylindrical surface portion 22a in the front-rear direction. In the case of this embodiment, width dimensions of the recessed groove 43a and the connection hole 39a in the circumferential direction are equal to each other and are slightly larger than a width of the connection terminal 36a in the circumferential direction (an interval between pins 35a and 35a disposed on both sides in the circumferential direction).

Particularly, in the case of this embodiment, an eccentric guide surface portion 48, which has a shape of a partially cylindrical surface and of which a center $O_{48}$ of curvature is offset to a side (lower side) opposite to a side on which the connection hole 39a is formed in the radial direction, in a range between a front end portion and a rear portion of an intermediate portion of the second cylindrical surface portion 32a. Furthermore, a radius of curvature of the eccentric guide surface portion 48 is larger than a half of an inner diameter of the second cylindrical surface portion 32a and is constant in the front-rear direction. For this reason, the eccentric guide surface portion 48 is formed between an intermediate portion and the lower end portion of a portion, which is formed between the front end portion and the rear portion of the intermediate portion of the second cylindrical surface portion 32a, except for an upper end portion; and the second cylindrical surface portion 32a is formed on the other portions as it is. That is, since the eccentric guide surface portion 48 is formed on a part of the second cylindrical surface portion 32a that is formed in a shape of a single cylindrical surface, the second cylindrical surface portion 32a is partially chipped. Further, in the case of this embodiment, the radius of curvature of the eccentric guide surface portion 48 is set to be larger than the half of the inner diameter of the second cylindrical surface portion 32a, and a pair of continuous portions 60 and 60, which allows the eccentric guide surface portion 48 and the second cylindrical surface portion 32a to be continuous in the circumferential direction, is positioned closer to a side (an upper side in FIG. 5), on which the connection hole 39a is formed, than a central axis $O_{16a}$ of the housing body 16a in the radial direction.

Furthermore, the offset amount ($M=|O_{16a}-O_{48}|$) of the eccentric guide surface portion 48 is larger than a difference ($X=H1-d1$) between a distance (H1) between a center of the torque detecting coil unit 31a to be described below and an end edge of the connection terminal 36a and a half (d1) of an inner diameter of the first cylindrical surface portion 22a ($M>X$). Moreover, the eccentric guide surface portion 48 and the second cylindrical surface portion 32a are continuous in the front-rear direction through a stepped surface 49 that substantially has the shape of a crescent in front view. The stepped surface 49 is an inclined surface that is inclined inward in the radial direction toward the rear side. In the case of this embodiment, a gap 50 is formed between an outer peripheral surface of the torque detecting coil unit 31a and the eccentric guide surface portion 48 when the torque detecting coil unit 31a (a detection body 33a) is fitted and fixed into the second cylindrical surface portion 32a.

The stepped surface 49 is formed at an axial position with which the detection body 33a of the torque detecting coil unit 31a comes into contact when the connection terminal 36a is put in the connection hole 39a.

The lower shaft 13a as an input shaft and the output shaft 19a, which are coaxially connected to each other by a torsion bar 18a, are rotatably supported in the housing 15a. The torsion bar 18a is made of spring steel. While most of the torsion bar 18a except for a rear end portion thereof is disposed on an inner diameter side of the output shaft 19a, a front end portion of the torsion bar 18a is joined to the front end portion of the output shaft 19a by a connecting pin 51 so as not to be relatively rotatable and the rear end portion of the torsion bar 18a is spline-fitted to a spline hole 52, which is formed at the radially central portion of the front end portion of the lower shaft 13a, so as not to be relatively rotatable.

Further, the output shaft 19a is made of steel, which is magnetic metal, so as to have a shape of a hollow shaft, and is rotatably supported on a front side of the lower shaft 13a in the housing 15a by the pair of ball bearings 20a and 21a. More specifically, a front portion of an intermediate portion of the output shaft 19a is rotatably supported by the ball bearing 20a that is fitted and fixed to an inner peripheral surface of the lid body 17a, and a rear portion of the intermediate portion of the output shaft 19a is rotatably supported by the ball bearing 21a that is fitted and fixed into the first cylindrical surface portion 22a that is formed at a front end portion of the inner peripheral surface of the housing body 16a. A universal joint 7 (see FIG. 9) is joined to a front end portion of the output shaft 19a that protrudes from a front end opening of the housing 15a.

Furthermore, a cylindrical portion 26a, which includes a female stopper portion 25a having an uneven shape (a shape of a gear) in the circumferential direction and formed on an inner peripheral surface thereof, is formed on a front end portion of the lower shaft 13a. A plurality of tooth portions 53 and 53 long in the axial direction are formed at regular intervals in the circumferential direction, and thus the female stopper portion 25a is formed. Meanwhile, a male stopper portion 27a, which has an uneven shape (a shape of a gear) in the circumferential direction and of which an outer diameter (a diameter of a circumcircle) is smaller than an outer diameter of a rear end portion, is formed on the rear end portion of the outer peripheral surface of the output shaft 19a. A plurality of groove portions 54 and 54 (of which the number is the same as the number of the tooth portions 53 and 53) long in the axial direction are formed on the rear end portion of the outer peripheral surface of the output shaft 19a at regular intervals in the circumferential direction, and thus the male stopper portion 27a is formed. The female stopper portion 25a and the male stopper portion 27a are engaged with each other so as to be relatively rotatable within a predetermined angular range (a range of, for example, ±5° from a neutral state where the torsion bar 18a is not twisted). That is, since the respective tooth portions 53 and 53 of the female stopper portion 25a and the respective groove portions 54 and 54 of the male stopper portion 27a are loosely engaged with each other while having a gap in the circumferential direction, a relative rotation between the lower shaft 13a and the output shaft 19a is regulated within a predetermined angular range. Accordingly, excessive torsion of the torsion bar 18a is prevented.

Further, a torque detecting uneven portion 28a, which has an uneven shape in the circumferential direction, is formed at a rear end portion, which is adjacent to the male stopper portion 27a in the axial direction, of the outer peripheral surface of the output shaft 19a. The torque detecting uneven portion 28a has an outer diameter (a diameter of a circumcircle) larger than the outer diameter of the male stopper portion 27a. A plurality of groove portions 55 and 55 long in the axial direction are formed on the rear end portion of the outer peripheral surface of the output shaft 19a at regular intervals in the circumferential direction, and thus the torque detecting uneven portion 28a is formed. In the case of the structure shown, the number of these respective groove portions 55 and 55 corresponds to the number of the respective groove portions 54 and 54 of the male stopper portion 27a and phases of these respective groove portions 55 and 55 correspond to phases of the respective groove portions 54 and 54 in the circumferential direction. That is, the respective groove portions 55 and 55 and the respective groove portions 54 and 54 are continuously formed in the axial direction.

Furthermore, the torque detecting sleeve 29a is made of non-magnetic metal having conductivity, such as an aluminum alloy, so as to have a cylindrical shape. The torque detecting sleeve 29a is concentrically disposed on the outer diameter side of the torque detecting uneven portion 28a. A base end portion (rear end portion) of the torque detecting sleeve 29a is fitted around and fixed to the cylindrical portion 26a. For this purpose, a plurality of axial grooves 56 and 56 long in the axial direction are formed on an outer peripheral surface of the cylindrical portion 26a at regular intervals in the circumferential direction. Further, a circumferential groove 57 is formed at a rear end portion of an outer peripheral surface of the cylindrical portion 26a over the entire circumference (except for portions where the axial grooves 56 and 56 are formed) of the cylindrical portion in the circumferential direction. Particularly, in the case of the structure shown, the circumferential groove 57 is disposed at a position where the circumferential groove and a rear end portion of an engagement portion between the female and male stopper portions 25a and 27a overlap each other in the radial direction. Meanwhile, a plurality of hemispherical protrusions 58 and 58 (of which a number is the same as a number of the axial grooves 56 and 56) are formed on the inner peripheral surface of the base end portion of the torque detecting sleeve 29a at regular intervals in the circumferential direction.

When the base end portion of the torque detecting sleeve 29a is fitted around and fixed to the cylindrical portion 26a, the base end portion of the torque detecting sleeve 29a is fitted around the cylindrical portion 26a and the protrusions 58 and 58 are engaged with the axial grooves 56 and 56, respectively. Further, a base end edge portion of the torque detecting sleeve 29a is caulked to the circumferential groove 57. That is, the base end edge portion is plastically deformed toward the inner diameter side to form a caulking portion and the caulking portion is engaged with the circumferential groove 57. As a result, the rotation of the torque detecting sleeve 29a relative to the cylindrical portion 26a is prevented on the basis of an engagement between the respective axial grooves 56 and 56 and the respective protrusions 58 and 58. Furthermore, on the basis of the engagement between the circumferential groove 57 and the caulking portion, the torque detecting sleeve 29a is positioned relative to the cylindrical portion 26a in the axial direction and the displacement of the torque detecting sleeve 29a relative to the cylindrical portion 26a in the axial direction is prevented.

Further, a plurality of substantially rectangular window holes 30a and 30a are formed at a portion formed between an end portion (front end portion) and an intermediate portion of the torque detecting sleeve 29a, which is a portion of the torque detecting sleeve 29a disposed on the outer diameter side of the torque detecting uneven portion 28a, in plural rows in the axial direction and at regular intervals in the circumferential direction. Phases of the window holes 30a and 30a of these both rows in the circumferential direction deviate from each other by a half of a pitch.

The torque detecting coil unit 31a is fitted and fixed into the second cylindrical surface portion 32a, which is formed on the rear side of the first cylindrical surface portion 22a, of the inner peripheral surface of the housing body 16a. The torque detecting coil unit 31a is concentrically disposed on the outer diameter side of the torque detecting uneven portion 28a and the torque detecting sleeve 29a. Furthermore, as shown in FIG. 6, the torque detecting coil unit 31a includes a cylindrical detection body 33a, a pedestal 34a that is formed so as to protrude outward from an outer peripheral surface of the detection body 33a in the radial direction and is made of a resin, and a connection terminal 36a that includes a plurality of (four in the embodiment shown in the drawings) pins 35a and 35a embedded into the pedestal 34a and made of metal. The detection body 33a includes a plurality of (two in the embodiment shown in the drawings) cylindrical coil bobbins 37a and 37a that are formed by a winding of coils, and a yoke member 38a that covers these respective coil bobbins 37a and 37a and is made of metal. The connection terminal 36a is formed so as to protrude outward from a part of the circumference of the detection body 33a in the radial direction, and is connected to the respective coil bobbins 37a and 37a. Further, a distance between the center of the torque detecting coil unit 31a (the detection body 33a) and the end edge of the connection terminal 36a (H1, a distance between the center of the detection body 33a and the farthest end edge among the end edges of the pins 35a and 35a) is larger than a half (d1) of the inner diameter of the first cylindrical surface portion 22a (H1>d1). Furthermore, a value obtained by adding a half of the outer diameter of the detection body 33a to the distance (H1) (=a value obtained by adding the length of the connection terminal 36a, which protrudes from the detection body 33a, to the outer diameter of the detection body 33a) is smaller than the inner diameter (2d1) of the first cylindrical surface portion 22a. Moreover, when the torque detecting coil unit 31a is assembled, both the coil bobbins 37a and 37a are disposed so as to overlap a portion, at which the window holes 30a and 30a of both the rows are formed, of the torque detecting sleeve 29a in the radial direction. Meanwhile, the torque detecting coil unit 31a is disposed concentrically with the ball bearing 21a, and the outer diameter of the torque detecting coil unit 31a (the detection body 33a) is smaller than the outer diameter of the ball bearing 21a.

The connection terminal 36a is connected to the circuit board 40a through the connection hole 39a that is formed at the housing body 16a. A motor control circuit is formed on the circuit board 40a, the circuit board 40a is disposed in the storage space 41a formed on an outer peripheral surface of the housing body 16a, and the storage space 41a is closed from an outside by a lid member (not shown).

Further, the worm-type speed reducer 44a is formed by a combination of a worm wheel 23a and a worm (not shown). The worm wheel 23a is fitted around and fixed to an axially intermediate portion of the output shaft 19a that is a portion of the output shaft 19a between both the ball bearings 20a and 21a. Furthermore, the worm (not shown) is rotatably supported in the housing 15a while meshing with the worm wheel 23a.

Moreover, the electric motor 10 (see FIG. 9) is supported by and fixed to the housing 15a. An output shaft of the electric motor 10 is joined to a base end portion of the worm (not shown) so that torque can be transmitted to the base end portion of the worm.

Further, a seal ring 59, which is made of an elastic material and prevents a lubricant in the housing 15a from flowing out to a space formed on the inner diameter side of the steering column 6b, is installed between an outer peripheral surface of an intermediate portion of the cylindrical portion 26a and an inner surface of the housing 15a.

When the electric power steering device of this embodiment having the above-mentioned structure is assembled, work for fitting and fixing the torque detecting coil unit 31a into the second cylindrical surface portion 32a formed on the inner peripheral surface of the housing body 16a is performed as shown in FIG. 7.

Figure 1:
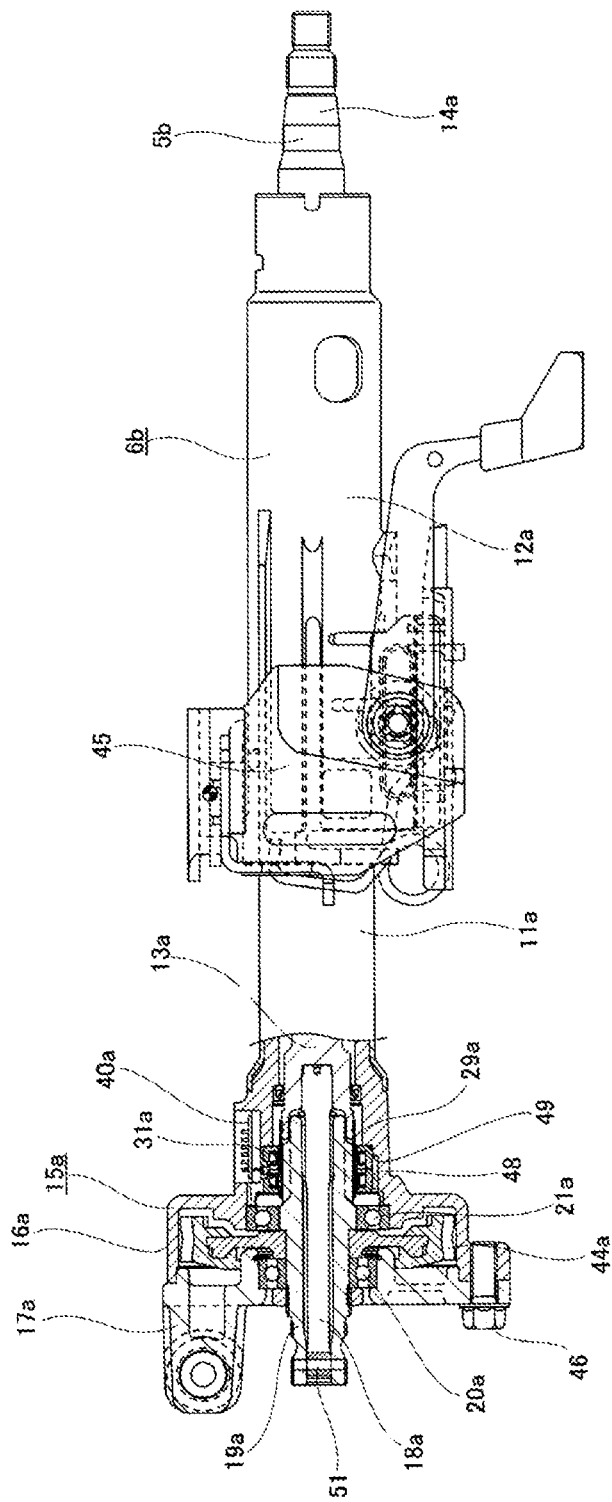
FIG. 1 is a partially sectioned side view of an electric power steering device according to a first embodiment of the invention.
Figure 2:
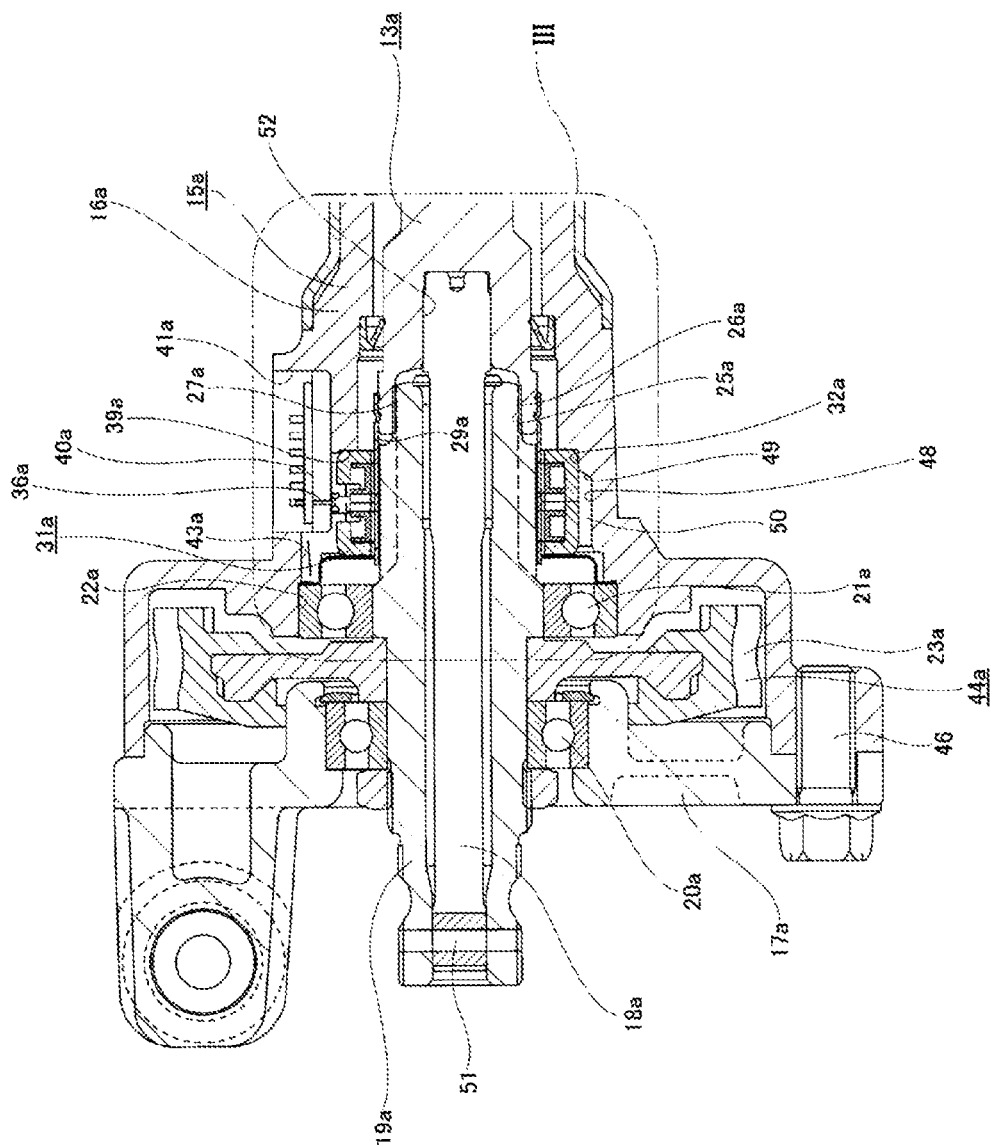
FIG. 2 is an enlarged view of a left end portion of FIG. 1.
Figure 3:
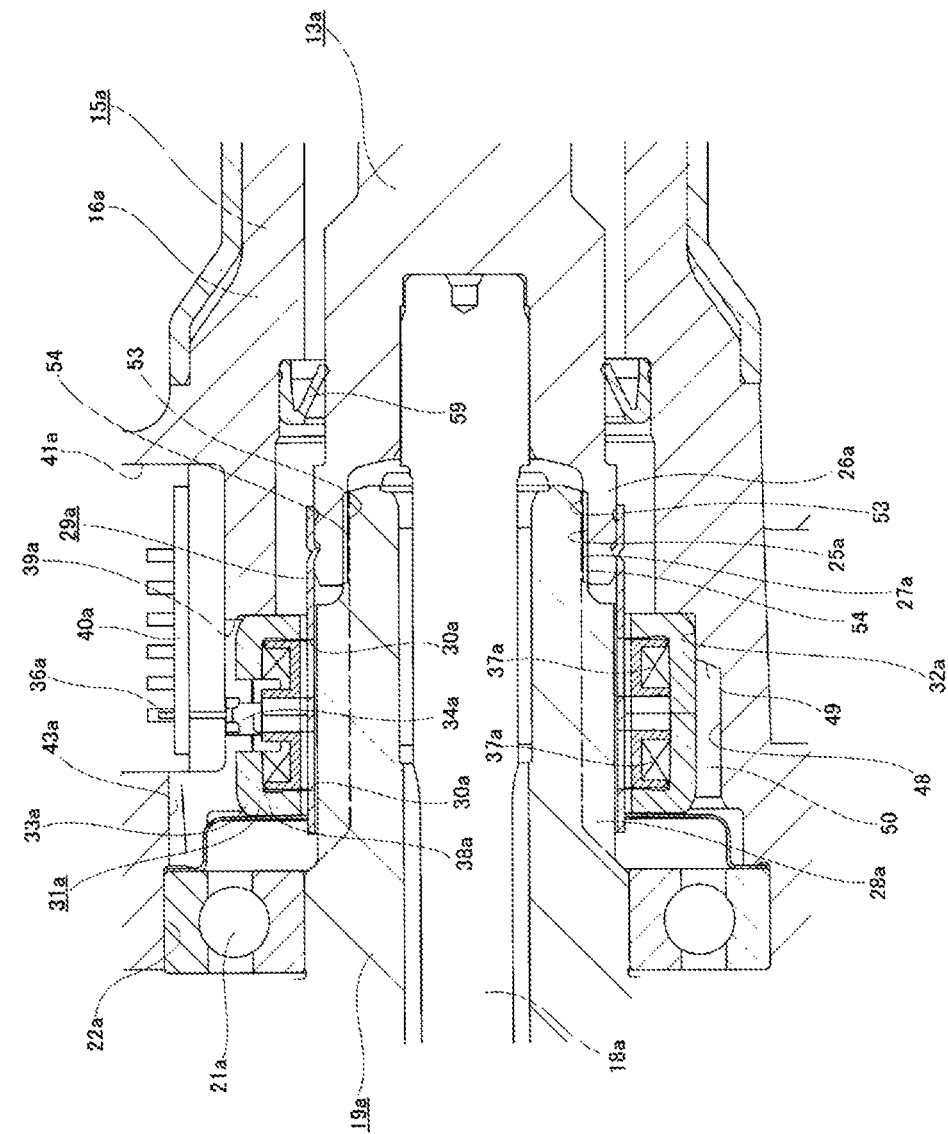
FIG. 3 is an enlarged view of a portion III of FIG. 2.
Figure 4:
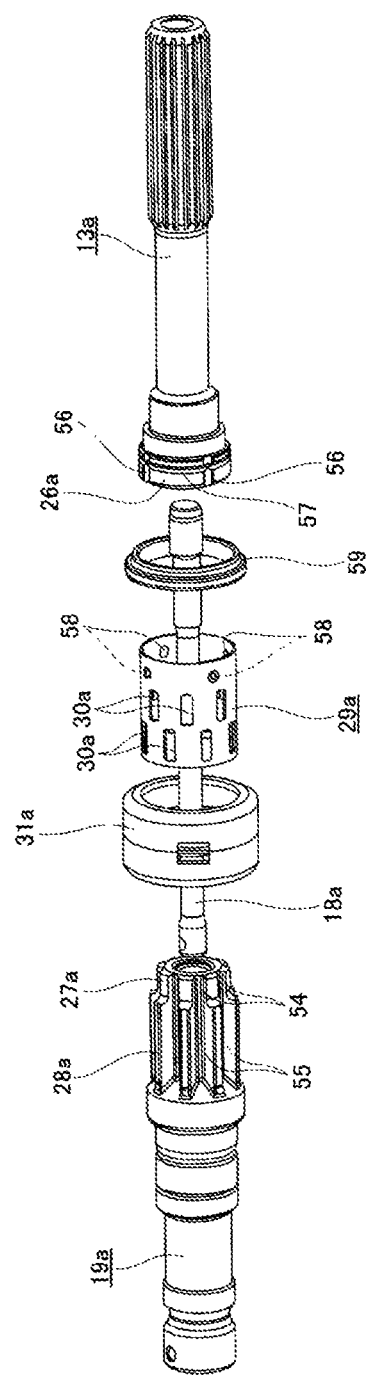
FIG. 4 is an exploded perspective view of various members of a torque measuring unit that is disposed in a housing.
Figure 7B:
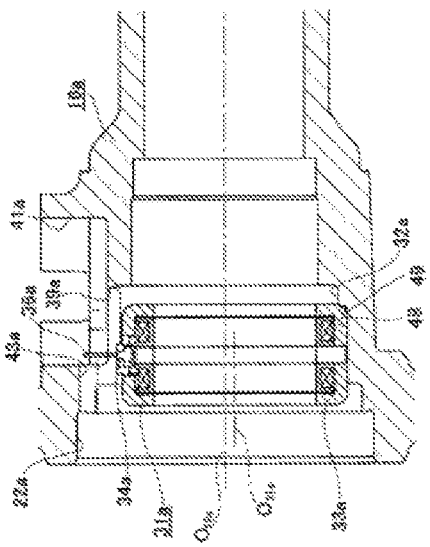
FIGS. 7A to 7D are cross-sectional views showing work for assembling the torque detecting coil unit with the housing body in order of processes.
Figure 7D:
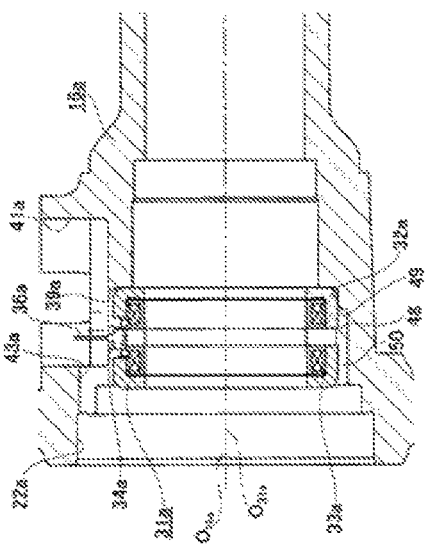
Figure 7A:
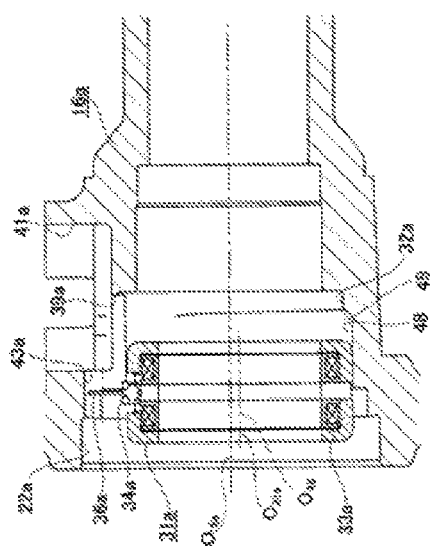

First, the torque detecting coil unit 31a is disposed to be offset to the lower side of the housing body 16a in the radial direction so that a central axis $O_{31a}$ of the torque detecting coil unit 31a passes through the center $O_{48}$ of curvature of the eccentric guide surface portion 48. Further, in this state, the torque detecting coil unit 31a is inserted into the housing body 16a from an opening portion of the housing body 16a, which is close to the first cylindrical surface portion 22a, in the axial direction (toward the rear side from the front side in an assembled state). Accordingly, the connection terminal 36a is caused to enter the first cylindrical surface portion 22a. Next, as shown in FIGS. 7A and 7B, the connection terminal 36a is caused to sequentially enter the recessed groove 43a and the connection hole 39a while the outer peripheral surface of the detection body 33a is guided by the eccentric guide surface portion 48 until the detection body 33a comes into contact with the stepped surface 49.

Figure 7C:
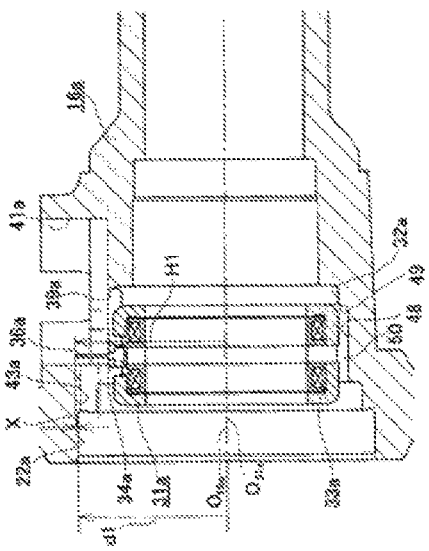

Further, after the detection body 33a comes into contact with the stepped surface 49, as shown in FIG. 7C, the torque detecting coil unit 31a is moved in the axial direction while the torque detecting coil unit 31a is moved up in the radial direction along the stepped surface 49 until the central axis $O_{31a}$ of the torque detecting coil unit 31a and the central axis $O_{16a}$ of the housing body 16a correspond to each other. In this state, the connection terminal 36a sufficiently enters the storage space 41a. Next, as shown in FIG. 7D, the torque detecting coil unit 31a is further moved in the axial direction and is fitted and fixed into the second cylindrical surface portion 32a. In the case of this embodiment, the torque detecting coil unit 31a is fitted and fixed into the second cylindrical surface portion 32a through these processes.

In the case of this embodiment having the above-mentioned structure, the size and weight of the electric power steering device are reduced while good assembly workability is ensured.

Figure 13:
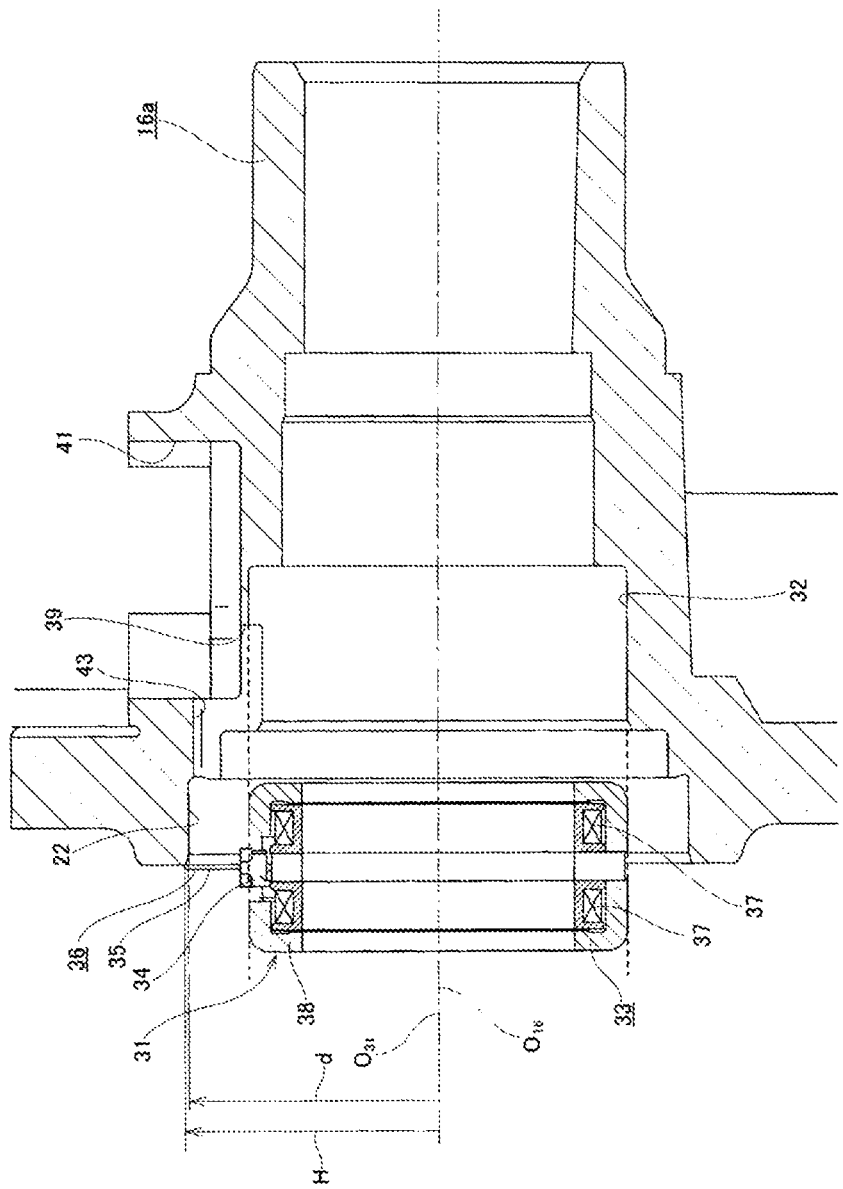
FIG. 13 is a sectional view taken along line XIII-XIII of FIG. 12.

That is, in the case of this embodiment, an eccentric guide surface portion 48, which has the shape of a partially cylindrical surface and of which the center of curvature is offset to the side opposite to the side on which the connection hole 39a is formed in the radial direction, is formed at a portion of the inner peripheral surface of the housing body 16a between the front end portion and the rear portion of the intermediate portion of the second cylindrical surface portion 32a into which the torque detecting coil unit 31a is fitted and fixed. For this reason, the torque detecting coil unit 31a is not coaxially disposed in the housing body 16a unlike in the case of the structure in the related art shown in FIG. 13, and can be inserted into the housing body 16a while being eccentric to the side (the side on which the eccentric guide surface portion 48 is formed) opposite to the protrusion direction of the connection terminal 36a in the radial direction. Accordingly, even though the diameter of the output shaft 19a or the ball bearing 21a is reduced (even though the height of the connection terminal 36a becomes relatively large) without the reduction of the height of the connection terminal 36a, it is possible to insert the torque detecting coil unit 31a into the housing body 16a without the interference occurring between the connection terminal 36a and the housing body 16a. Further, it is also possible to guide the outer peripheral surface of the detection body 33a by using the eccentric guide surface portion 48 during this work.

As a result, according to the structure and an assembly method of this embodiment, the size and weight of the torque measuring unit are reduced (eventually, the size and weight of the electric power steering device are reduced) while good assembly workability is ensured. For this reason, automatic assembly using a robot can also be performed.

Further, since the respective continuous portions 60 and 60 are positioned closer to the side, on which the connection hole 39a is formed, than the central axis $O_{16a}$ of the housing body 16a in the radial direction, it is possible to make the respective continuous portions 60 and 60 be smoothly continuous (to make a state in which steps are not present). For this reason, since it is possible to prevent the torque detecting coil unit 31a from being caught by the respective continuous portions 60 and 60 when the torque detecting coil unit 31a is inserted into the housing body 16a, it is possible to improve the workability of insertion work. That is, when the continuous portions between the eccentric guide surface portion 48 and the second cylindrical surface portion 32a are formed on one side of the central axis $O_{16a}$ opposite to the connection hole 39a contrary to the structure of this embodiment, the continuous portions are not smoothly continuous (steps are present). For this reason, there is a possibility that the torque detecting coil unit 31a may be caught by the continuous portions when the torque detecting coil unit 31a is inserted therein. However, in the case of this embodiment, it is possible to prevent this trouble from occurring.

Furthermore, since the stepped surface 49 is an inclined surface in the case of this embodiment, it is possible to move the torque detecting coil unit 31a in the axial direction while moving the torque detecting coil unit 31a inward in the radial direction. For this reason, the time required for work for assembling the torque detecting coil unit 31a is reduced.

Moreover, when torque as a steering force is applied to the steering shaft 5b by the driver's operation of the steering wheel 1 (see FIG. 9) even in the case of this embodiment, the torsion bar 18a is elastically twisted (within a predetermined angular range) so as to correspond to the direction and the magnitude of this torque. Accordingly, the change of impedance occurs on the coil bobbins 37a and 37a of the torque detecting coil unit 31a due to the change of a positional relationship between the torque detecting uneven portion 28a and the torque detecting sleeve 29a in the circumferential direction. For this reason, it is possible to detect the direction and the magnitude of torque on the basis of the change of impedance. The motor control circuit formed on the circuit board 40a controls the flow of current of the electric motor 10 (see FIG. 9) by using a torque detection result, so that auxiliary power corresponding to the direction and the magnitude of torque is generated by the electric motor 10. The auxiliary power is applied to the output shaft 19a after being increased by the worm-type speed reducer 44a. As a result, the amount of force, which is required for a driver to operate the steering wheel 1, is reduced.

Meanwhile, when the torsion of the torsion bar 18a reaches an upper limit on one side or the other side of the predetermined angular range due to the input of large torque to the steering shaft 5b from the steering wheel 1, the female stopper portion 25a and the male stopper portion 27a mesh with each other in the circumferential direction. Further, a part of torque is directly transmitted to the output shaft 19a from the lower shaft 13a on the basis of the mesh. In this case, the cylindrical portion 26a tends to be twisted according to the transmission of the torque. However, in the case of this embodiment, a portion including the circumferential groove 57 formed at the outer peripheral surface, which has lower torsional stiffness than a torsional stiffness of the other axial portions, of the cylindrical portion 26a is a portion overlapping the engagement portion between the female and male stopper portions 25a and 27a in the radial direction. For this reason, when a part of torque is directly transmitted between the lower shaft 13a and the output shaft 19a through the engagement portion between the female and male stopper portions 25a and 27a, the rear end portion of the output shaft 19a on which the male stopper portion 27a is formed serves as a reinforcing member. Accordingly, it is possible to improve the torsional stiffness of the portion that includes the circumferential groove 57 formed at the outer peripheral surface of the cylindrical portion 26a.

Second Embodiment

Figure 8:
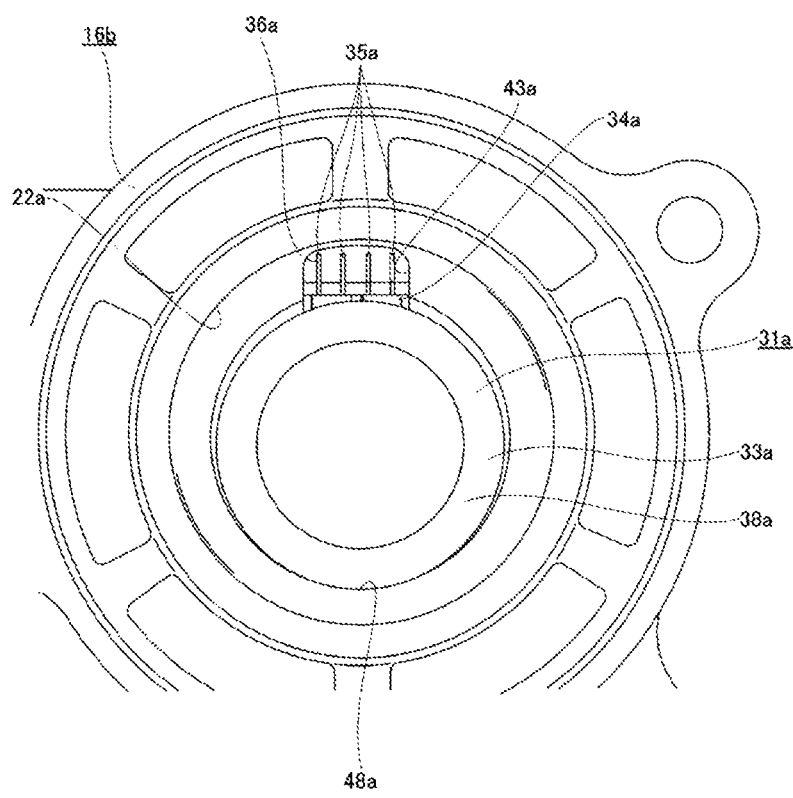
FIG. 8 is a view showing a second embodiment of the invention which corresponds to FIG. 12.

FIG. 8 shows a second embodiment of the invention. This embodiment is characterized in that the offset amount of an eccentric guide surface portion 48a formed on the inner peripheral surface of a housing body 16b is appropriately regulated to further improve the workability of assembly work. That is, in the case of this embodiment, the offset amount of the eccentric guide surface portion 48a is regulated so that both side surfaces of a pedestal 34a in a circumferential direction and both side surfaces of a recessed groove 43a in the circumferential direction face each other in the circumferential direction (overlap each other in a radial direction) while a torque detecting coil unit 31a is inserted into the housing body 16b, the outer peripheral surface of a detection body 33a comes into contact with the eccentric guide surface portion 48a, and a connection terminal 36a enters the recessed groove 43a.

In the case of this embodiment described above, the side surfaces of the pedestal 34a in the circumferential direction can be guided by the side surfaces of the recessed groove 43a in the circumferential direction when the torque detecting coil unit 31a is inserted into the housing body 16b. Accordingly, the torque detecting coil unit 31a is positioned relative to the housing body 16b in the circumferential direction. For this reason, assembly workability can be further improved.

Other structures and effects are the same as those of the above-mentioned first embodiment.

INDUSTRIAL APPLICABILITY

When the invention is embodied, the stepped surface formed on the inner peripheral surface of the housing body is not limited to an inclined surface and may be a flat surface that is present on a virtual plane orthogonal to the central axis of the housing body or may be a curved surface having an arc-shaped cross-section. Further, an example of the structure in which only one pin of the torque detecting coil unit is provided in the axial direction has been described in the embodiment. However, a structure that includes pins arranged in two rows as in the related art shown in FIG. 11 and a structure that includes a plurality of pins are also included in the invention.

Meanwhile, the invention is not limited to the above-mentioned embodiments, and may be appropriately changed, modified, and the like.

For example, the radius of curvature of the eccentric guide surface portion is set to be larger than half of the inner diameter of the second cylindrical surface portion in this embodiment, but may be set to be equal to half of the inner diameter of the second cylindrical surface portion. In this case, the second cylindrical surface portion and the eccentric guide surface portion are formed in an elliptical shape connected by two parallel straight lines.

Figure 10:
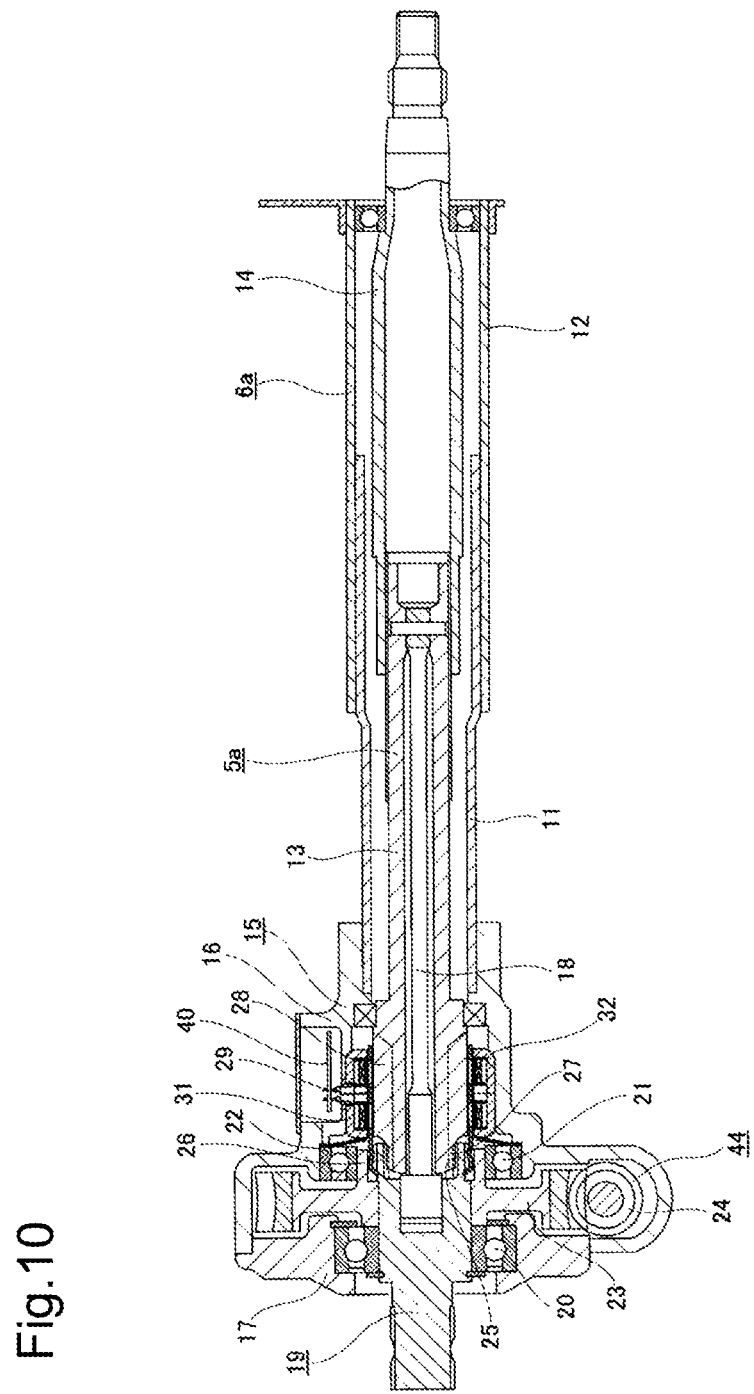
FIG. 10 is a cross-sectional view showing an example of the structure of an electric power steering device in the related art.
Figure 11:
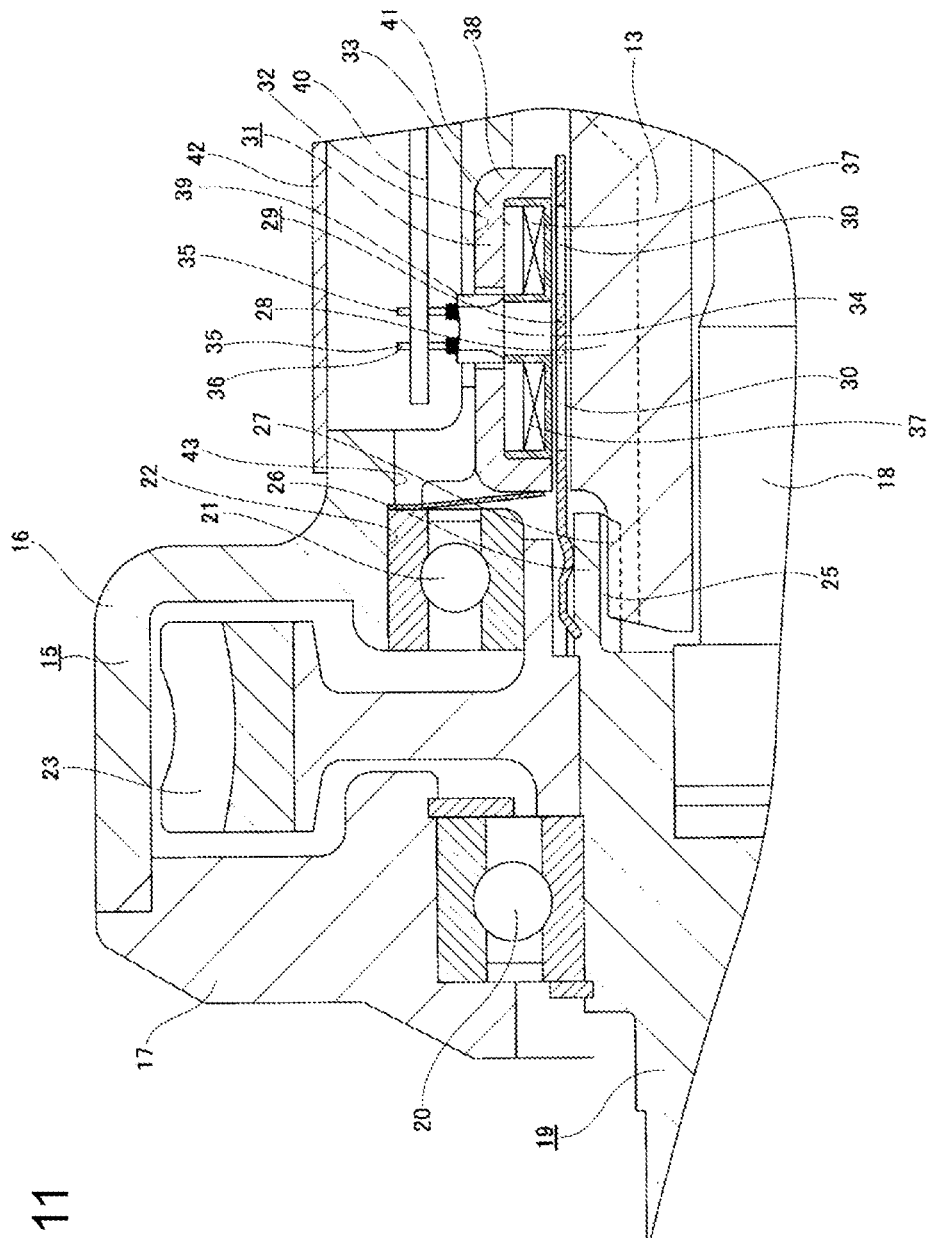
FIG. 11 is an enlarged view of an upper half portion of a left end portion of FIG. 10.
Figure 12:
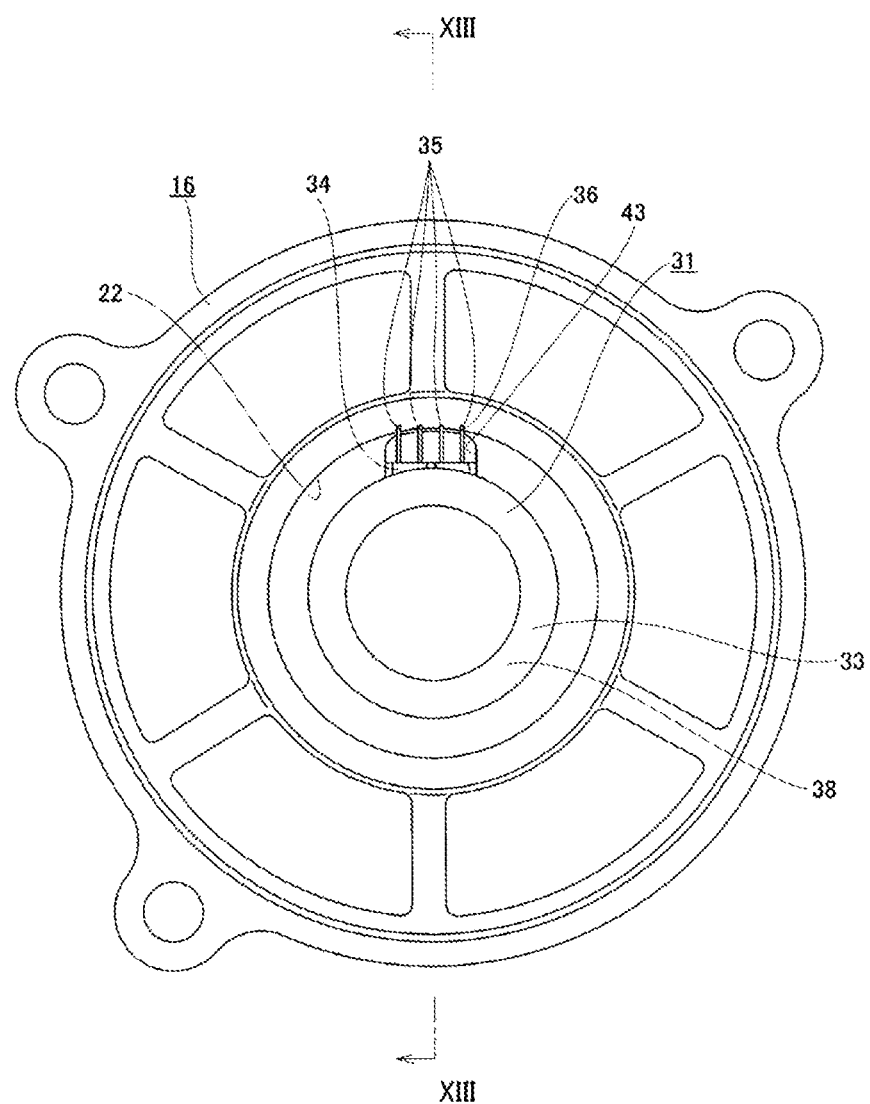
FIG. 12 is an end view showing problems of the structure in the related art.

Further, the invention may be applied to a structure in which the female stopper portion is formed on the output shaft and the male stopper portion is formed on the lower shaft as in the structure shown in FIGS. 10 and 11. Furthermore, the invention may be applied to a structure in which the torque detecting sleeve is fixed to the lower shaft as in the structure shown in FIGS. 10 and 11.

Priority is claimed on Japanese Patent Application No. 2013-240505 filed Nov. 21, 2013, the content of which is incorporated herein by reference.

DESCRIPTION OF REFERENCE NUMERALS

1: STEERING WHEEL
2: STEERING GEAR UNIT
3: INPUT SHAFT
4: TIE-ROD
5, 5a, 5b: STEERING SHAFT
6, 6a, 6b: STEERING COLUMN
7: UNIVERSAL JOINT
8: INTERMEDIATE SHAFT
9: UNIVERSAL JOINT
10: ELECTRIC MOTOR
11, 11a: INNER COLUMN
12, 12a: OUTER COLUMN
13, 13a: LOWER SHAFT
14, 14a: UPPER SHAFT
15, 15a: HOUSING
16, 16a: HOUSING BODY
17, 17a: LID BODY
18, 18a: TORSION BAR
19, 19a: OUTPUT SHAFT
20, 20a: BALL BEARING
21, 21a: BALL BEARING
22: FIRST CYLINDRICAL SURFACE PORTION
23, 23a: WORM WHEEL
24: WORM
25, 25a: FEMALE STOPPER PORTION
26, 26a: CYLINDRICAL PORTION
27, 27a: MALE STOPPER PORTION
28, 28a: TORQUE DETECTING UNEVEN PORTION
29, 29a: TORQUE DETECTING SLEEVE
30, 30a: WINDOW HOLE
31, 31a: TORQUE DETECTING COIL UNIT
32, 32a: SECOND CYLINDRICAL SURFACE PORTION
33, 33a: DETECTION BODY
34, 34a: PEDESTAL
35, 35a: PIN
36, 36a: CONNECTION TERMINAL
37, 37a: COIL BOBBIN
38, 38a: YOKE MEMBER
39, 39a: CONNECTION HOLE
40, 40a: CIRCUIT BOARD
41, 41a: STORAGE SPACE
42: LID MEMBER
43, 43a: RECESSED GROOVE
44, 44a: WORM-TYPE SPEED REDUCER
45: SUPPORT BRACKET
46: BOLT
47: JOINING FLANGE
48, 48a: ECCENTRIC GUIDE SURFACE PORTION
49: STEPPED SURFACE
50: GAP
51: CONNECTING PIN
52: SPLINE HOLE
53: TOOTH PORTION
54: GROOVE PORTION
55: GROOVE PORTION
56: AXIAL GROOVE
57: CIRCUMFERENTIAL GROOVE
58: PROTRUSION
59: SEAL RING
60: CONTINUOUS PORTION

The invention claimed is:

1. A torque measuring unit for an electric power steering device, comprising:
a housing that includes a housing body and a lid body fixed to the housing body;
an input shaft and an output shaft that are rotatably supported in the housing and are coaxially connected to each other by a torsion bar;
a rolling bearing that is fitted and fixed into a first cylindrical surface portion formed at one end portion of an inner peripheral surface of the housing body in an axial direction and supports the output shaft so as to allow the output shaft to be rotatable relative to the housing body; and a torque detecting coil unit that is fitted and fixed into a second cylindrical surface portion having a diameter smaller than a diameter of the first cylindrical surface portion and formed closer to the other side of the inner peripheral surface of the housing body in the axial direction than the first cylindrical surface portion so as to be concentric with the first cylindrical surface portion, and detects a direction and a magnitude of torque applied to the input shaft, wherein the torque detecting coil unit includes an annular detection body that includes a coil, and a connection terminal which is provided at a portion of the detection body in a circumferential direction so as to protrude outward in a radial direction, and a distance between a center of the detection body and an end edge of the connection terminal is larger than a half of an outer diameter of the rolling bearing, a connection hole, which is formed in the radial direction, is formed at a portion matching the second cylindrical surface portion in the axial direction on a part of the housing body in the circumferential direction, a recessed groove, which is recessed outward in the radial direction, is formed at a portion, of which a phase corresponds to a phase of the connection hole in the circumferential direction, of the inner peripheral surface of the housing body between the connection hole and the first cylindrical surface portion in the axial direction, an eccentric guide surface portion, which has a shape of a partially cylindrical surface and of which a center of curvature is offset to a side opposite to a side on which the connection hole is formed in the radial direction, is formed at one end portion of the second cylindrical surface portion in the axial direction, and the eccentric guide surface portion and the second cylindrical surface portion are continuous in an axial direction through a stepped surface.

2. The torque measuring unit for an electric power steering device according to claim 1, wherein a radius of curvature of the eccentric guide surface portion is larger than a half of an inner diameter of the second cylindrical surface portion, and a pair of continuous portions, which allows the eccentric guide surface portion and the second cylindrical surface portion to be continuous in the circumferential direction, is positioned closer to a side, on which the connection hole is formed, than a central axis of the housing body in the radial direction.

3. The torque measuring unit for an electric power steering device according to claim 1, wherein the stepped surface is an inclined surface that is inclined inward in the radial direction toward the other side in the axial direction.

4. The torque measuring unit for an electric power steering device according to claim 1, wherein the connection terminal is embedded into a pedestal that is formed so as to protrude outward from an outer peripheral surface of the detection body in the radial direction, and while the outer peripheral surface of the detection body comes into contact with the eccentric guide surface portion and the connection terminal enters the recessed groove, side surfaces of the pedestal in the circumferential direction and side surfaces of the recessed groove in the circumferential direction face each other in the circumferential direction.

5. A method of assembling the torque measuring unit for an electric power steering device according to claim 1, the method comprising:

inserting the torque detecting coil unit into the housing body from one axial opening portion of the housing body, which is close to the first cylindrical surface portion, in the axial direction while the torque detecting coil unit is disposed to be offset from the housing body in the radial direction so that a central axis of the torque detecting coil unit passes through the center of curvature of the eccentric guide surface portion, thereby making the connection terminal enter the first cylindrical surface portion;

making the connection terminal sequentially enter the recessed groove and the connection hole while guiding the outer peripheral surface of the detection body by the eccentric guide surface portion until the detection body comes into contact with the stepped surface;

after the detection body comes into contact with the stepped surface, moving the torque detecting coil unit in the radial direction until the central axis of the torque detecting coil unit and a central axis of the housing body correspond to each other; and further moving the torque detecting coil unit in the axial direction to fit and fix the torque detecting coil unit into the second cylindrical surface portion.

* * * * *